(12) United States Patent
Jalali et al.

(10) Patent No.: US 9,882,630 B2
(45) Date of Patent: Jan. 30, 2018

(54) OVERLAYING AN AIR TO GROUND COMMUNICATION SYSTEM ON SPECTRUM ASSIGNED TO SATELLITE SYSTEMS

(75) Inventors: Ahmad Jalali, Rancho Santa Fe, CA (US); Leonard N. Schiff, San Diego, CA (US); William G. Ames, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 596 days.

(21) Appl. No.: 13/210,628

(22) Filed: Aug. 16, 2011

(65) Prior Publication Data

US 2013/0044611 A1  Feb. 21, 2013

(51) Int. Cl.
| H04B 7/185 | (2006.01) |
| H04W 16/14 | (2009.01) |
| H04W 36/30 | (2009.01) |
| H04W 36/20 | (2009.01) |

(52) U.S. Cl.
CPC ..... *H04B 7/18508* (2013.01); *H04B 7/18502* (2013.01); *H04W 16/14* (2013.01); *H04W 36/30* (2013.01); *H04W 36/20* (2013.01)

(58) Field of Classification Search
USPC ................. 370/252; 455/12.1, 13.1
See application file for complete search history.

(56) References Cited

U.S. PATENT DOCUMENTS

| 5,627,546 | A |   | 5/1997 | Crow |
| 5,649,303 | A | * | 7/1997 | Hess ..................... H04W 16/14 370/337 |
| 5,937,019 | A | * | 8/1999 | Padovani ..................... 375/358 |
| 6,236,834 | B1 | * | 5/2001 | Poskett et al. ............... 455/13.1 |
| 6,272,325 | B1 | * | 8/2001 | Wiedeman ......... H04B 7/18543 340/600 |
| 6,286,104 | B1 | * | 9/2001 | Buhle et al. ....................... 726/4 |
| 6,556,822 | B1 | * | 4/2003 | Matsumoto .................. 455/421 |
| 7,505,736 | B2 |   | 3/2009 | Min |
| 7,706,746 | B2 |   | 4/2010 | Karabinis et al. |
| 8,116,762 | B2 |   | 2/2012 | Soliman |

(Continued)

FOREIGN PATENT DOCUMENTS

| EP | 2161855 A1 | 3/2010 |
| JP | 2000501266 A | 2/2000 |

(Continued)

OTHER PUBLICATIONS

International Search Report and Written Opinion—PCT/US2012/051201—ISA/EPO—Apr. 5, 2013.

(Continued)

*Primary Examiner* — Jeffrey M Rutkowski
*Assistant Examiner* — Mandish Randhawa
(74) *Attorney, Agent, or Firm* — MG-IP Law, P.C.

(57) ABSTRACT

An air to ground communication system provides internet access to aircraft from ground based stations. The air to ground system shares spectrum with uplink portions of a satellite communication spectrum. Interference mitigation techniques are employed to avoid interference between the ground based communications and satellite communications. Fade mitigation techniques are employed to provide communication to aircraft at low angles of elevation in the presence of rain.

42 Claims, 6 Drawing Sheets

(56) References Cited

U.S. PATENT DOCUMENTS

| | | | |
|---|---|---|---|
| 2005/0053026 A1 | 3/2005 | Mullan et al. | |
| 2005/0232212 A1* | 10/2005 | Kang | H04W 36/0061 370/338 |
| 2009/0100476 A1 | 4/2009 | Frisco et al. | |
| 2009/0191879 A1* | 7/2009 | Ichikawa et al. | 455/442 |
| 2011/0263199 A1* | 10/2011 | Cruz et al. | 455/12.1 |

FOREIGN PATENT DOCUMENTS

| | | |
|---|---|---|
| JP | 2004274327 A | 9/2004 |
| JP | 2010213266 A | 9/2010 |
| JP | 2011055463 A | 3/2011 |
| WO | 2011017577 A2 | 2/2011 |

OTHER PUBLICATIONS

Partial International Search Report—PCT/US2012/051201—ISA/EPO—Jan. 30, 2013.
European Search Report—EP14192242—Search Authority—Munich—dated Apr. 8, 2015.

* cited by examiner

OVERLAYING AN AIR TO GROUND COMMUNICATION SYSTEM ON SPECTRUM ASSIGNED TO SATELLITE SYSTEMS

FIELD OF THE DISCLOSURE

Aspects of the present disclosure provide a system and method for wireless communication and more particularly for providing internet communication to aircraft.

BACKGROUND

Two main approaches have been used to provide internet access to airplanes. In one approach, an Air to Ground (ATG) system uses terrestrial Ground Base Stations (GBS) using cellular communication techniques to provide internet access to aircraft flying over land. A currently used ATG system operating over the continental United States uses only 3 MHz of spectrum. Although, this system may become commercially viable, the limited spectrum may be inadequate to accommodate increasing demand for internet services such as streaming of internet content to aircraft. In another approach, satellite links provide internet service to aircraft. The satellite based systems have more spectrum available but their cost is excessive.

Because of the excessive cost of using satellite links for aircraft internet communication, it has been preferable to utilize the terrestrial based ATG systems. It would be desirable to increase available spectrum for ATG and provide techniques that would allow such systems to accommodate the increasing demands for aircraft internet service without substantially increasing cost.

SUMMARY

Aspects of the present disclosure include a system for wireless communication in which a ground base station may be configured to transmit and receive signals on a satellite uplink band with an aircraft transceiver. The ground base station may be configured to reduce interference with satellite communications on the satellite uplink band.

Another aspect of the present disclosure includes a system for wireless communication including an aircraft transceiver in communication with a ground base station. The aircraft transceiver may be configured to transmit and receive signals on the satellite uplink band while reducing interference with satellite communications on the satellite uplink band.

Another aspect of the present disclosure includes a method of avoiding signal degradation in a wireless air to ground communication system. The method includes monitoring signal strength between a ground base station and an aircraft transceiver communicating in a satellite uplink band. The method may include determining whether the signal is subject to excessive rain fade according to a predetermined criteria based on the signal strength. In response to determining that the signal strength is subject to excessive rain fade, the communication may be handed off from the ground base station to a second ground base station.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Aspects of the present disclosure increase spectrum available for terrestrial ATG systems by providing techniques and apparatus for sharing spectrum used by other communication systems without causing intolerable interference with communications on the other systems.

The spectrum available for internet communication to aircraft by terrestrial ATG systems has been limited for practical and economic reasons. Providing seamless communication with aircraft flying at high altitudes over a large area such as the continental U.S. involves spectrum that is available over the large area. That is, the spectrum assigned to the ATG should be available nationwide. It has been problematic to identify a portion of spectrum that is available nationwide or to arrange to free up such a portion of spectrum that has been allocated for other uses.

Another problem with providing more spectrum to the ATG application is that revenue from such applications may be substantially less than revenue from comparable portions of spectrum used for other purposes, such as terrestrial cellular mobile systems. Therefore, the cost for an ATG operator to acquire additional portions of spectrum, for example in a Federal Communication Commission (FCC) auction, would need to be substantially lower than an amount that would be affordable by terrestrial cellular mobile system operators. Aspects of the present disclosure provide a system and method for reusing spectrum that has been assigned to other services without interfering with those services.

Figure 1:
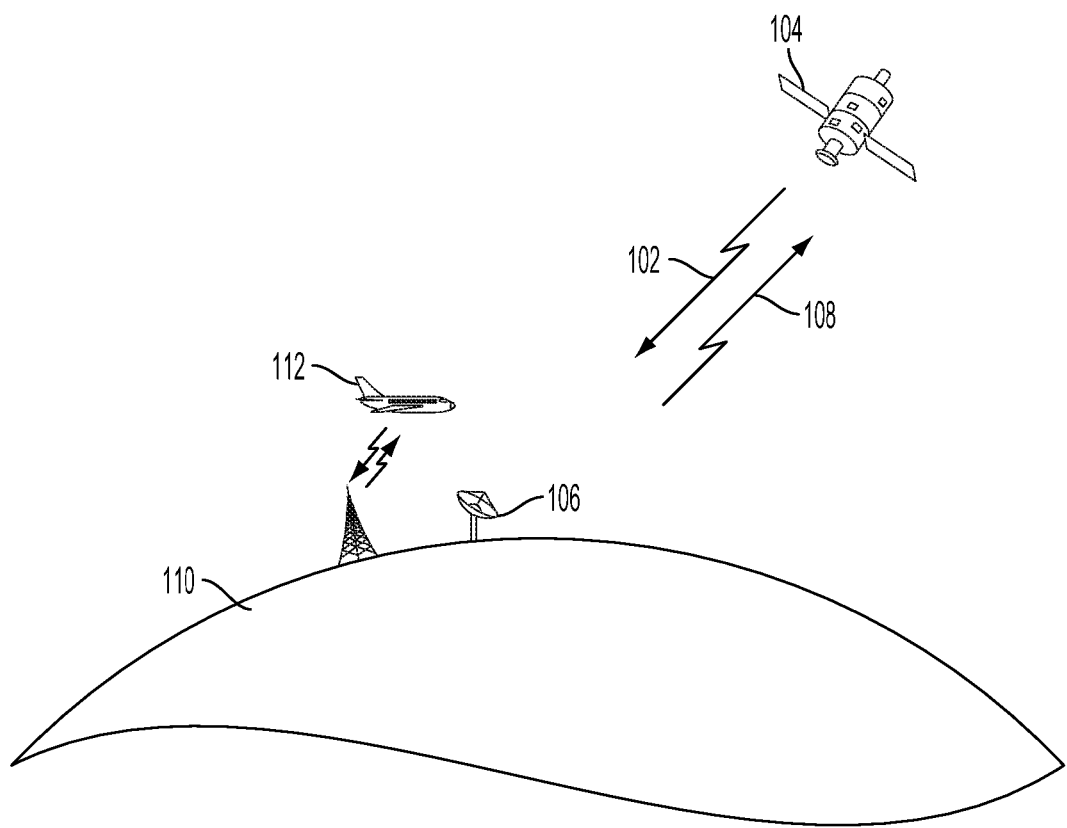
FIG. 1 is a diagram of a satellite communication system and an air to ground communication system according to an aspect of the present disclosure.

A large amount of spectrum has been assigned to geostationary satellites for use in broadcast TV and two way FSS (Fixed Satellite Service). Aspects of the present disclosure provide a system and method for sharing portions of the spectrum between ATG applications and geostationary satellite communication systems. Frequency bands such as C band (4 GHz downlink, 6 GHz uplink), Ku band (12 GHz downlink, 14 GHz uplink) and Ka band (20 GHz downlink, 30 GHz uplink) are currently used by geostationary satellite systems. Referring to FIG. 1, the downlink communications 102 are directed from a satellite 104 to receivers in a ground station 106, and uplink communications 108 are directed from transmitters in the ground station 106 transmitters to the satellite 104.

Overlaying the ATG system on the downlink portions of satellite system spectrum is problematic because the ATG ground base stations 110 would be too close to the satellite ground station 106 receivers and may increase the interference to satellite receivers excessively. On the uplink frequency, however, the ATG transceivers (the aircraft transceivers (ATs) 112 and the ground base stations 110) are relatively much closer to each other than they are to the satellite 104. For instance, if the ground base station sites 110 are spaced apart from each other by 200 km, then the distance between the aircraft transceiver 112 and farthest ground base station 110 may be as low as 300 km. But the distance from the ground base stations 110 to the satellite 104 is more than 35,000 km. This corresponds to a difference of about 41 dB in path loss terms.

By utilizing uplink portions of a satellite system spectrum for the ATG system according to aspects of the present disclosure, a typical ATG system's transmitted signal may be 41 dB weaker when it is received at the satellite than the same signal when it is received at the ATG receiver. Thus, it is more feasible to use the uplink frequency for the ATG system than the downlink frequency.

Figure 2:
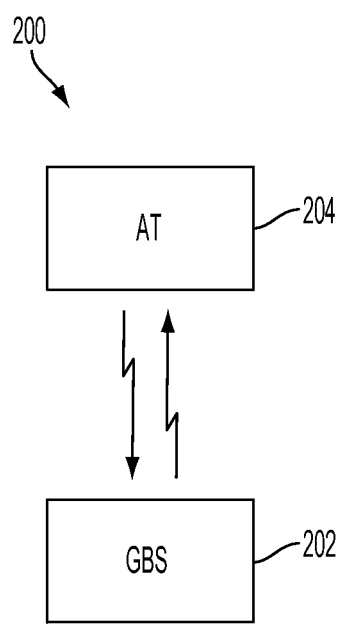
FIG. 2 is a block diagram of an air to ground communication system according to an aspect of the present disclosure.

A system 200 for wireless communication according to an illustrative embodiment of the present disclosure is described with reference to FIG. 2. The system 200 includes a ground base station 202 configured to transmit and receive signals on a satellite uplink band. An aircraft transceiver (AT) 204 in communication with the ground base station 202 is configured to transmit and receive signals on the satellite uplink band. The ground base station 202 and aircraft transceiver 204 are configured to reduce interference with satellite communications on the satellite uplink band.

Aspects of the present disclosure provide methods and apparatus for an ATG system in which, Ground Base Stations (GBSs) in communication with aircraft transceivers (ATs) in airplanes can use the uplink portion of spectrum assigned for satellite systems without intolerable interference with communications on the satellite systems. The system and techniques described in the present disclosure allow coexistence of the incumbent satellite system and the new ATG system on the same spectrum with negligible cross interference between the two systems.

Because both the aircraft transceiver and the ground base station use the same spectrum, they may communicate with each other using a Time Division Duplex (TDD) scheme, where the aircraft transceiver and the ground base station alternately transmit on the same frequency but in different time slots. Alternatively, the uplink portion of the spectrum that is allocated to the satellite system (typically 500 MHz) may be divided into two parts with a guard band in the middle. In this case the aircraft transceiver and ground base stations can communicate using a Frequency Division Duplex (FDD) scheme where both sides transmit at the same time but in different parts of the uplink frequency. A disadvantage of this FDD scheme is that it wastes some of the spectrum for guard band and the transceivers need a duplexer filter to isolate the transmit and receive paths at the antenna. Therefore, the FDD approach causes some loss of spectrum efficiency and adds hardware cost and complexity to the system.

In addition to taking advantage of the differential distance between the ATG transceivers and the satellite for interference mitigation by using only the uplink portion of the satellite system spectrum, there are a number of other techniques that can be used to further isolate the ATG signals from the satellite according to aspects of the present disclosure.

Another technique that can be used to further reduce interference with satellite communications according to an aspect of the present disclosure is to spread the ATG system's transmitted power over a wider bandwidth. The C, Ku and Ka bands have 500 MHz of spectrum allocated for the uplink. If by spreading the ATG's transmitted power over a wider bandwidth effectively uses only 50 MHz of the spectrum spread over 500 MHz, for example, then the power spectral density may be reduced by a factor of 10. This example would provide another 10 dB of effective isolation to the satellite.

Figure 3:
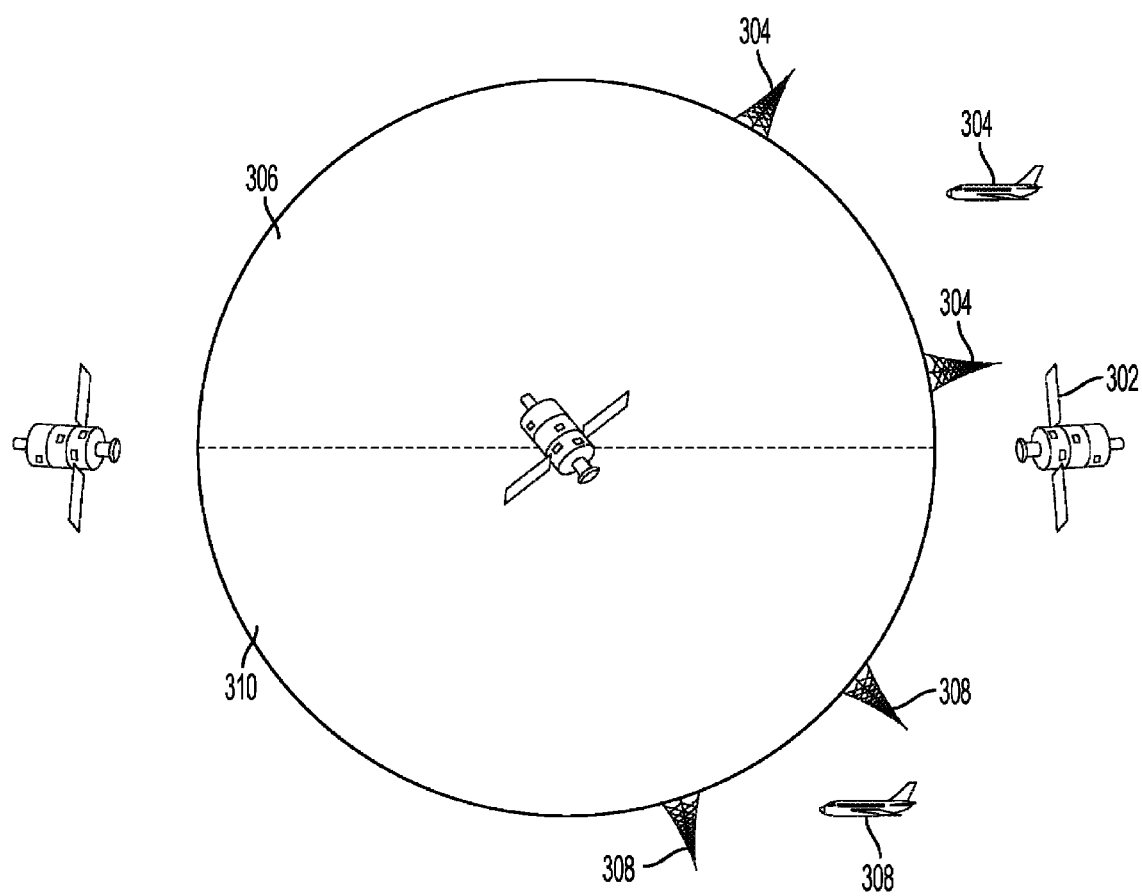
FIG. 3 is a diagram of an air to ground communication system according to aspects of the present disclosure with reference to a geostationary satellite communication system.

Additional interference mitigation techniques are described according to aspects of the present disclosure. Referring to FIG. 3, certain interference techniques described herein are applied to geostationary satellite systems in which the geostationary satellites 302 are located in equatorial orbit, i.e., in a general southerly direction relative to ATG system components 304 in the northern hemisphere 306, and in a generally northerly direction relative to ATG system components 308 in the southern hemisphere 310. Although aspects of the present disclosure are described primarily herein with reference to ATG system components 304 located in the northern hemisphere 306, it should be understood by persons skilled in the art that the aspects may also be employed in the southern hemisphere 310 and may be described by generally reversing the terms describing northerly or southerly directionality. Other interference mitigation techniques are described as being applied in non-geostationary satellite systems. It should be understood that non-geostationary satellites travel along Low Earth Orbits (LEOs) or Medium Earth Orbits (MEOs).

Although various aspects and embodiments of the present disclosure described herein with reference to the earth's equator and with reference to certain satellites in equatorial orbits, for example, it should be understood by persons skilled in the art that geostationary satellites may orbit in a geostationary position on a geostationary arc that does not always precisely coincide with the plane of the earth's equator. It should be understood that each of the aspects and embodiments of the present disclosure which refer to the term "equator" are more precisely directed to aspects and embodiments in which the term "equator" could be replaced by the term "geostationary arc." However, for clarity and conciseness, the term "equator" is used throughout the present disclosure.

Figure 4:
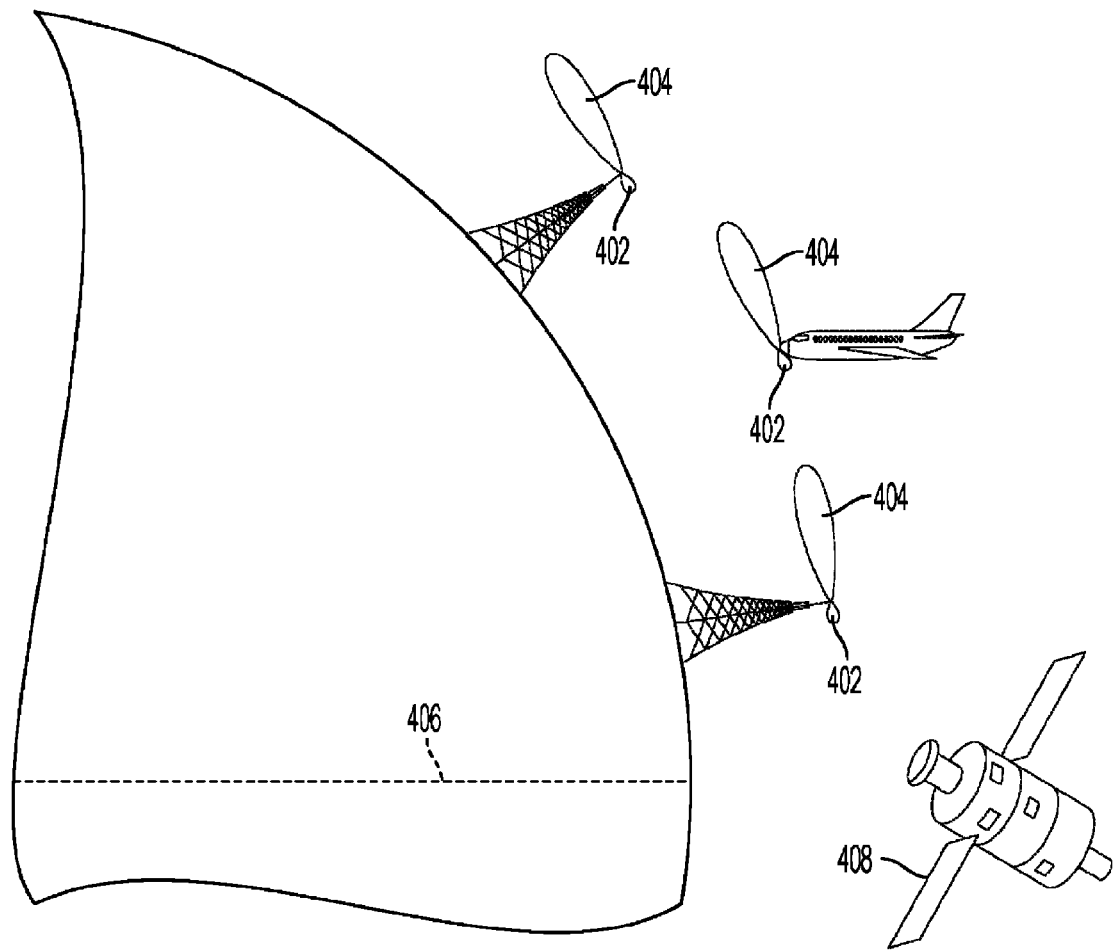
FIG. 4 is a diagram of radiation patterns of directional antennas in an air to ground communication system according to an aspect of the present disclosure.

According to an aspect of the present disclosure, one technique for mitigating interference between geostationary satellite communications and ATG transceivers is to use directional antennas at the ATG transceivers and to point the ATG transmit antennas away from the equator, i.e., toward north for ATG transceivers in the continental United States. Referring to FIG. 4, it is shown that the backlobe portion 402 of the directional antenna's radiation pattern has much lower gain than the front lobe portion 404 of the directional antenna's radiation pattern. By directing the front lobe portion 404 of the directional antenna away from the equator 406, the ATG signal strength seen by the satellite 408 is reduced by the relative gain of the front to back ratio of the ATG antenna. The relative gain difference between the front lobe 404 and back lobe 402 of the directional antenna can be as much as about 25 dB so that a signal received by an ATG component in the front lobe of the radiation pattern is 25 dB stronger than the signal received by a receiver at a similar distance in the backlobe of the radiation pattern. This technique of directing the ATG transmit antennas away from the equator according to aspects of the present disclosure further reduces the interference between ATG communication signals and geostationary satellite communications.

According to aspects of the present disclosure, ATG system transceivers in aircraft and ATG system transceivers in the ground base stations transmit toward north (away from the equator) and direct their receivers toward the south (toward the equator). In other words the aircraft transceiver (AT) over the U.S. transmits toward a ground base station in its north direction to avoid interfering with a satellite over the equator. But when the aircraft transceiver is receiving a signal from a ground base station, it points toward the south because the ground base stations' transmitters are also pointed toward the north direction. Therefore, according to an aspect of the present disclosure, the aircraft transceiver antenna on an aircraft is directed toward the north when it is transmitting and directed toward the south when it is receiving. According to one illustrative embodiment, the aircraft transceiver can receive and transmit simultaneously using two separate antennas. According to another illustrative embodiment, the aircraft transceiver can use one physical antenna but by electronically forming beams in the two directions.

In an alternative embodiment, the aircraft transceiver antenna on the aircraft may be directed to ward the equator when it is receiving and when it is transmitting. In this case, it may be determined that the interference with a geostationary satellite caused by transmission from the aircraft toward the equator, for example, is acceptable. The GBS receive antennas may be directed away from the equator or otherwise configured to receive transmissions from aircraft in a direction away from the equator. In an illustrative embodiment the GBS may receive on the same antenna that it uses for transmissions directed away from the equator.

Figure 5:
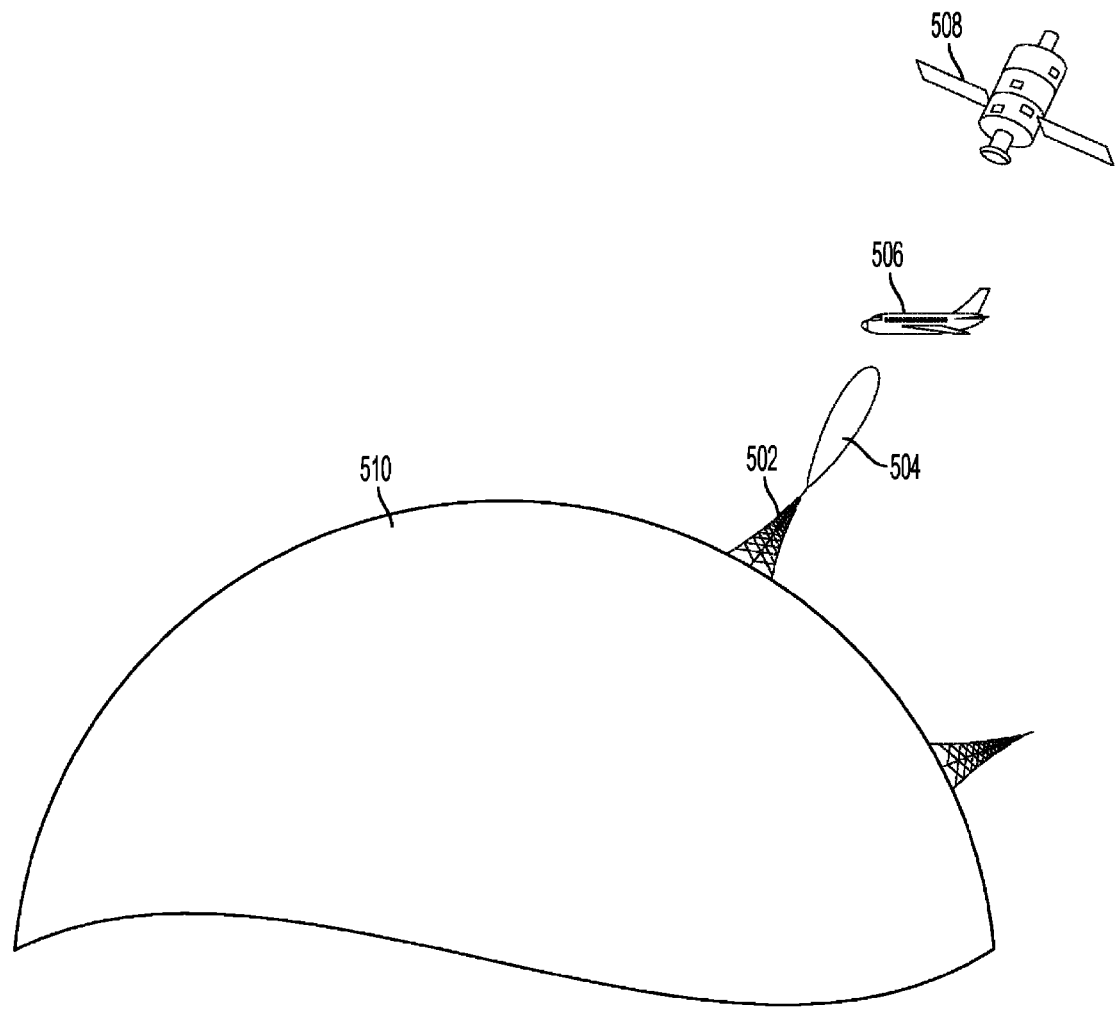
FIG. 5 is a diagram of an air to ground communication system according to aspects of the present disclosure with reference to a non-geostationary satellite communication system.

Non-geostationary satellites consist of a constellation of large number of satellites, often around 50 satellites, orbiting in Low Earth Orbits (LEOs) or Medium Earth Orbits (MEOs). The non-Geo satellites constantly move in their orbits at high speeds. With reference to FIG. 5, according to embodiments of the present disclosure the ground base station 502 forms narrow beams 504 toward the aircraft 506. If the ground base station 502, the aircraft 506 being served by the ground base station 502 and the non-geostationary satellite 508 do not line up within the narrow beam 504 then ground base station's 504 transmission will not cause interference to the non-geostationary satellite 508.

However, as shown in FIG. 5, there will be cases where the ground base station 502, the aircraft 506 being served by the ground base station 502 and the satellite 508 will be lined up within the beam 504 from ground base station 502 being directed toward the aircraft 506. In this situation, the ground base station's beam 504 which is aimed at the aircraft 506 will cause interference to the satellite communications. According to aspects of the present disclosure, in order to avoid interfering with the satellite 508, the ground base station 502 that is currently serving the aircraft 506 (serving ground base station) can handoff the aircraft 506 to an alternative ground base station 510. The alternative ground base station 510 is chosen to be the ground base station from which the aircraft receives the highest data rate while not interfering with the satellites. Because the alternative ground base station 510 will not be lined up with a path between the aircraft 506 and the satellite 508, it can serve the aircraft 506 without causing interference to the satellite.

According to aspects of the present disclosure, the ground base stations have access to information describing the non-geostationary satellite almanac and orbits. The serving ground base station determines if the ground base station, an aircraft it is serving and a satellite have lined up within the ground base station's beam based on the position of the satellites and the aircraft. According to this determination, the ground base station can handoff the aircraft to the alternative ground base station. Once the ground base station determines that the satellite, the original serving ground base station before handoff and the aircraft are no longer lined up and the original ground base station's beam toward the aircraft will no longer cause interference to the satellite, the current non-optimal alternative ground base station may handoff the aircraft back to the original serving ground base station or to a ground base station from which the aircraft can receive the highest data rate. In rare cases where the serving ground base station is the only ground base station available to an aircraft and the ground base station, the aircraft and the satellite happen to line up, the ground base station may temporarily either reduce the data rate, and therefore reduce the interference caused to the satellite, or temporarily discontinue transmission to the aircraft until the ground base station, the aircraft and the satellite are no longer aligned.

Because non-geostationary satellites are constantly moving and may be located anywhere in space with respect to the aircrafts and ground base stations' transmissions from aircraft transceivers may also interfere with non-geostationary satellite communications, aspects of the present disclosure ensure that the interference from the aircraft terminals to non-Geo satellite is negligible regardless of the relative position of aircrafts and satellites. According to one aspect of the present disclosure, interference is reduced by increasing the gain of the ground base station antenna. This helps to reduce the transmit power requirement from the aircraft. As described above, according to aspects of the disclosure, the ground base station antenna forms narrow beams both on the transmit and receive directions toward the served aircraft. This narrow beam on the receive direction at the ground base station significantly reduces the transmit power requirement at the aircraft in order to make the interference caused to the satellite negligible. According to another aspect of the present disclosure, interference may be further reduced by positioning the aircraft transceiver antenna under the belly of the aircraft so that the fuselage of the aircraft provides considerable isolation between the antenna and the satellites.

Transmissions from non-geostationary satellite terminals may interfere with communications from a ground base station to an aircraft transceiver on a served aircraft. Ground terminals that communicate with the non-geostationary satellites generally move their antennas to track the satellites with which they are communicating. Once a satellite is moving away from the view of the ground terminal's antenna, the terminal will handoff to another satellite in the non-geostationary satellite constellation. Because the terminal moves its antenna to track the satellite, the boresight of the terminal's antenna, i.e., highest gain directions of the antenna, can potentially move in all angles in both azimuth and elevation. Therefore, there may be instances where the boresight of the non-geostationary satellite ground terminal antenna points directly toward the aircraft's antenna. Aspects of the present disclosure provide a number of techniques to mitigate this type of interference to the aircraft terminal.

According to one aspect of the present disclosure, a ground base station may spread its signal over a wide range of frequencies so that even if part of the spectrum is interfered with by a satellite ground terminal, the aircraft may still be able to receive data from the ground base station but perhaps at a lower rate. This spreading technique may be used because the non-geostationary satellite ground terminals generally transmit within a small portion of the available spectrum.

According to aspects of the present disclosure, the link between the ground base station and a served aircraft may be rate controlled. Feedback may be provided from the aircraft to the ground base station to instruct the ground base station to adjust its rate so the aircraft receiver may still be able to decode a transmitted packet in the presence of interference. If interference at the aircraft is increased, then the aircraft may inform the ground base station through the feedback mechanism to lower its rate.

According to another aspect of the present disclosure, the ground base station may assign narrower frequency channels to the link between the ground base station and the aircraft. If these channels are found to be interfered with at certain times by satellite ground terminals then the ground base station may dynamically assign a different frequency channel to the aircraft terminal. The dynamic frequency channel assignment by the ground base station may be based on SINR (Signal to Interference plus Noise Ratio) feedback that the aircraft terminals send to the ground base station for all forward link frequency channels. By using rate adaptation on the forward link between the ground base station and aircraft terminal, by spreading the forward link over a wider bandwidth to average out any interference from a satellite ground terminal as described above or by using dynamic frequency assignment to avoid high interference channels the ground base station can maintain the link between the ground base station and aircraft terminal but perhaps at lower rates even when the satellite ground terminal happens to point toward the aircraft antenna.

In addition to addressing potential interference with satellite communications, other signal degradation problems are addressed by aspects of the present disclosure. In particular, aspects of the present disclosure provide techniques for handling signal degradation caused by rain when either the Ka band or the Ku band is used by an ATG communication system. Because in ATG communication systems the elevation angle of an airplane from the ground base station is low, it is likely that some fraction of the path between the airplane and the ground base station may be attenuated by rain. Because of the low elevation angles in ATG system compared to a satellite system, for example, the distance that the ATG signal may traverse in rain is larger than the distance that a satellite systems' signals would generally traverse in rain. Therefore, potential degradation due to rain fade is more problematic for ATG communication links than for satellite links.

Figure 6:
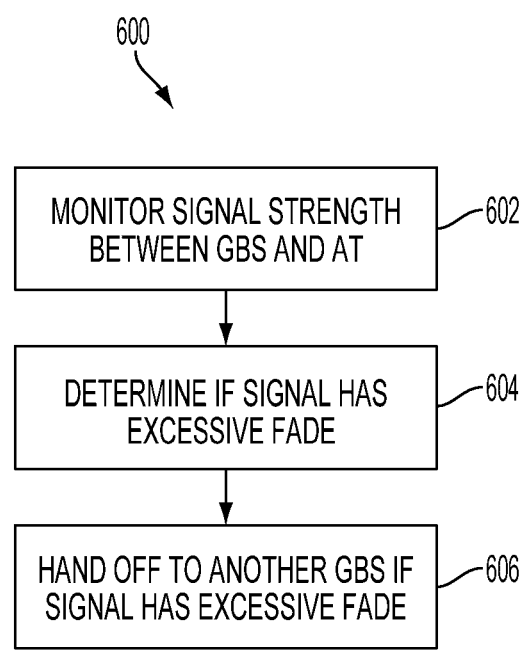
FIG. 6 is a process flow diagram showing a method of mitigating signal fade according to an aspect of the present disclosure.

Aspects of the present disclosure provide adequate margins in the link budget and also provide techniques to mitigate rain fade in ATG systems. According to an aspect of the disclosure, one technique to mitigate rain fade is to use ground base station diversity. A method to mitigate rain fade according to this technique is described with reference to FIG. 6. In block 602 of the method 600, the aircraft transceiver and/or the ground base station receivers monitor signal strength. In block 604, the aircraft transceiver and/or the ground base station determine if the path between the aircraft transceiver and its assigned ground base station has excessive fade. In block 606, if excessive fade exists in the link, the aircraft transceiver is handed off to communicate with a different ground base station with adequate geographic separation from its current ground base station to reduce the probability that the path between the aircraft transceiver and the new ground base station would also be in fade. In an illustrative embodiment, an aircraft transceiver typically can see at least three ground base stations in its north direction at a particular time. Therefore, the probability that paths from the aircraft transceiver to all three ground base stations will be in fade at the same time is low.

According to aspects of the present disclosure, the aircraft transceiver periodically searches for signals being transmitted from other neighboring ground base stations in order to assess the best ground base station, from signal strength point of view, with which to communicate. Once a ground base station with a stronger received signal is found, the aircraft transceiver is directed to start communicating with the new ground base station. The link between each aircraft transceiver and the ground base station may be power controlled to ensure that a reduced or minimum amount of power is transmitted by both the aircraft transceiver and the ground base station to close the link while reducing or minimizing interference to the satellite.

According to aspects of the present disclosure, data rates between the aircraft transceiver and the ground base station are also rate controlled. The aircraft transceiver and the ground base station estimate received Signal to Interference plus Noise (SINR) at both ends of the link and adjust their data rates to the highest rates that the receiver may still correctly decode with high probability. First, the aircraft transceiver and the ground base station estimate the SINR at each end and increase their powers such that the receiver side can still decode the packet while transmitting at the highest rate the system is provisioned to operate at. If interference from the satellite uplink transmitter increases to the ATG system or if rain fade increases and the transmitters exceeds the maximum (or some threshold) available transmit power then the aircraft transceiver and ground base station adjust their data rates lower so that they can still reliably decode the packets.

The antenna at the aircraft may either mechanically or electronically adjust its beam to point to the right ground base station in order to increase the link budget ground base station antenna gain. However, the ground base station antenna gain will be limited if the ground base station sector antenna is restricted to one fixed sector wide antenna. In order to increase the ground base station antenna gain one approach would be to use beam forming from the ground base station to each aircraft transceiver. According to one aspect of the present disclosure, the location of an aircraft transceiver is estimated using position location information, such as GPS information, for example, and the beam from the ground base station is pointed toward the aircraft transceiver. This helps to increase the ground base station antenna gain. According to another aspect of the present disclosure, the sector is constructed using multiple fixed narrow beam antennas. As the aircraft moves, the ground base station combines signals from multiple narrow beams on the uplink to increase or maximize the signal received from the aircraft transceiver.

In one embodiment, each ground base station assigns time slots to system wide control channels on the downlink direction to the aircraft transceiver. The ground base station transmits on a wide beam in the allowed time slots to enable signal strength measurements by the aircraft transceiver. During actual data transmissions, data is transmitted on a narrow beam directed to the aircraft transceiver. Phased array techniques can also be employed to fix the narrow beams. In another embodiment, multiple fixed narrow beams are formed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system for wireless communication comprising:
a ground base station configured to transmit and receive signals on a satellite uplink band with an aircraft transceiver, the ground base station further configured:
to handoff the aircraft transceiver to another ground base station for reducing interference to satellite communications on the satellite uplink band, when the ground base station and the aircraft transceiver are aligned with a non-geostationary satellite and when the other ground base station is available for handoff; and
to temporarily reduce a data rate or discontinue transmission to the aircraft transceiver until the ground base station and the aircraft transceiver are no longer aligned with the non-geostationary satellite when the other ground base station is not available.

2. The system of claim 1, in which the ground base station is further configured to spread transmit power across a frequency band to reduce power spectral density of transmissions.

3. The system of claim 1, in which the ground base station is further configured to direct transmissions away from a geostationary arc of Earth.

4. The system of claim 3, further comprising:
transmit antennas of the ground base station directed away from the geostationary arc.

5. The system of claim 4, further comprising:
receiving antennas of the ground base station directed toward the geostationary arc.

6. The system of claim 5, in which the receiving antennas and transmit antennas are configured as separate antennas.

7. The system of claim 5, in which the receiving antennas and transmit antennas are configured separately by beam forming on a single antenna.

8. The system of claim 1, in which the ground base station is further configured for reducing interference to satellite communications by reducing a transmit power on a communication link between the ground base station and the aircraft transceiver until the ground base station and the aircraft transceiver are no longer aligned with the non-geostationary satellite, the transmit power reduced when no other ground base station is available for handoff.

9. The system of claim 1, in which the ground base station is further configured for reducing interference to satellite communications by directing ground base station antennas away from the equator.

10. A system for wireless communication comprising:
an aircraft transceiver in communication with a ground base station, configured to transmit and receive signals on a satellite uplink band, the aircraft transceiver further configured:
to handoff to another ground base station for reducing interference to satellite communications on the satellite uplink band, when the ground base station and the aircraft transceiver are aligned with a non-geostationary satellite and when the other ground base station is available for handoff; and
to temporarily reduce a data rate or discontinue transmission until the ground base station and the aircraft transceiver are no longer aligned with the non-geostationary satellite when the other ground base station is not available.

11. The system of claim 10, in which the aircraft transceiver is further configured to spread transmit power across a frequency band to reduce power spectral density of transmissions.

12. The system of claim 10, in which the aircraft transceiver is further configured to direct transmissions away from a geostationary arc of Earth.

13. The system of claim 12, further comprising:
transmit antennas of the aircraft transceiver directed away from the geostationary arc.

14. The system of claim 13, further comprising:
receiving antennas of the aircraft transceiver directed toward the geostationary arc.

15. The system of claim 14, in which the receiving antennas and transmit antennas are configured as separate antennas.

16. The system of claim 14, in which the receiving antennas and transmit antennas are configured separately by beam forming on a single antenna.

17. The system of claim 10, in which the aircraft transceiver is further configured for reducing interference to satellite communications by reducing a transmit power on a communication link between the ground base station and the aircraft transceiver until the ground base station and the aircraft transceiver are no longer aligned with the non-geostationary satellite, the transmit power reduced when no other ground base station is available for handoff.

18. The system of claim 10, in which the aircraft transceiver is further configured for reducing interference to satellite communications by directing transmissions towards the equator.

19. A method for wireless communication comprising:
transmitting and receiving signals by a ground base station on a satellite uplink band with an aircraft transceiver;
handing off the aircraft transceiver to another ground base station for reducing interference to satellite communications on the satellite uplink band, when the ground base station and the aircraft transceiver are aligned with a non-geostationary satellite and when the other ground base station is available for handoff; and
temporarily reducing a data rate or discontinuing transmission to the aircraft transceiver until the ground base station and the aircraft transceiver are no longer aligned with the non-geostationary satellite when the other ground base station is not available.

20. The method of claim 19, further comprising:
spreading transmit power across a frequency band to reduce power spectral density of transmissions.

21. The method of claim 19, further comprising:
directing transmissions away from a geostationary arc of Earth.

22. The method of claim 21, further comprising:
directing receiving antennas of the ground base station toward the geostationary arc.

23. The method of claim 22, further comprising:
configuring the receiving antennas and transmit antennas as separate antennas.

24. The method of claim 22, further comprising:
configuring the receiving antennas and transmit antennas separately by beam forming on a single antenna.

25. The method of claim 19, in which the ground base station is further configured for reducing interference to satellite communications by reducing a transmit power on a communication link between the ground base station and the aircraft transceiver until the ground base station and the aircraft transceiver are no longer aligned with the non-geostationary satellite, the transmit power reduced when no other ground base station is available for handoff.

26. The method of claim 19, in which the ground base station is further configured for reducing interference to satellite communications by directing ground base station antennas away from the equator.

27. An apparatus for wireless communication comprising:
means for transmitting and receiving signals by a ground base station on a satellite uplink band with an aircraft transceiver;
means for handing off the aircraft transceiver to another ground base station for reducing interference to satellite communications on the satellite uplink band, when the ground base station and the aircraft transceiver are aligned with a non-geostationary satellite and when the other ground base station is available for handoff; and
means for temporarily reducing a data rate or discontinuing transmission to the aircraft transceiver until the ground base station and the aircraft transceiver are no longer aligned with the non-geostationary satellite when the other ground base station is not available.

28. An apparatus for wireless communication comprising:
   at least one processor; and
   a memory coupled to the at least one processor, the at least one processor being configured:
      to transmit and receive signals on a satellite uplink band with an aircraft transceiver;
      to hand off the aircraft transceiver to another ground base station for reducing interference to satellite communications on the satellite uplink band, when a ground base station and the aircraft transceiver are aligned with a non-geostationary satellite; and when the other ground base station is available for handoff; and
      to temporarily reduce a data rate or discontinue transmission to the aircraft transceiver until the ground base station and the aircraft transceiver are no longer aligned with the non-geostationary satellite when the other ground base station is not available.

29. The apparatus of claim 28, in which the at least one processor is further configured for reducing interference to satellite communications by reducing a transmit power on a communication link between the ground base station and the aircraft transceiver until the ground base station and the aircraft transceiver are no longer aligned with the non-geostationary satellite, the transmit power reduced when no other ground base station is available for handoff.

30. The apparatus of claim 28, in which the at least one processor is further configured for reducing interference to satellite communications by directing ground base station antennas away from the equator.

31. A computer program product for wireless communications in a wireless network, comprising:
   a non-transitory computer-readable medium having program code recorded thereon, the program code comprising:
      program code to transmit and receive signals by a ground base station on a satellite uplink band with an aircraft transceiver;
      program code to hand off the aircraft transceiver to another ground base station for reducing interference to satellite communications on the satellite uplink band, when the ground base station and the aircraft transceiver are aligned with a non-geostationary satellite and when the other ground base station is available for handoff; and
      program code to temporarily reduce a data rate or discontinue transmission to the aircraft transceiver until the ground base station and the aircraft transceiver are no longer aligned with the non-geostationary satellite when the other ground base station is not available.

32. The computer program product of claim 31, further comprising program code for reducing interference to satellite communications by reducing a transmit power on a communication link between the ground base station and the aircraft transceiver until the ground base station and the aircraft transceiver are no longer aligned with the non-geostationary satellite, the transmit power reduced when no other ground base station is available for handoff.

33. The computer program product of claim 31, further comprising program code for reducing interference to satellite communications by directing ground base station antennas away from the equator.

34. A first ground base station, comprising:
   a transceiver configured to transmit and receive signals on a satellite uplink band; and
   a controller configured:
      to handoff an aircraft transceiver to a second ground base station for reducing interference to satellite communications on the satellite uplink band, when the first ground base station and the aircraft transceiver are aligned with a non-geostationary satellite and when the second ground base station is available for handoff; and
      to temporarily reduce a data rate or discontinue transmission to the aircraft transceiver until the ground base station and the aircraft transceiver are no longer aligned with the non-geostationary satellite when the other ground base station is not available.

35. The first ground base station of claim 34, in which the controller is further configured to select the second ground base station based at least in part on a data rate available from the second ground base station and whether the second ground base station and the aircraft transceiver are aligned with the non-geostationary satellite.

36. The first ground base station of claim 34, in which the controller is further configured to spread transmit power across a frequency band to reduce power spectral density of transmissions.

37. The first ground base station of claim 34, in which the controller is further configured to direct transmissions away from a geostationary arc of Earth.

38. The first ground base station of claim 37, further comprising transmit antennas directed away from the geostationary arc.

39. The first ground base station of claim 38, further comprising receiving antennas directed toward the geostationary arc.

40. The first ground base station of claim 39, in which the receiving antennas and transmit antennas are configured as separate antennas.

41. The first ground base station of claim 39, in which the receiving antennas and transmit antennas are configured separately by beam forming on a single antenna.

42. The first ground base station of claim 34, in which the controller is further configured for reducing interference to satellite communications by directing first ground base station antennas away from the equator.

* * * * *